Figure 1:
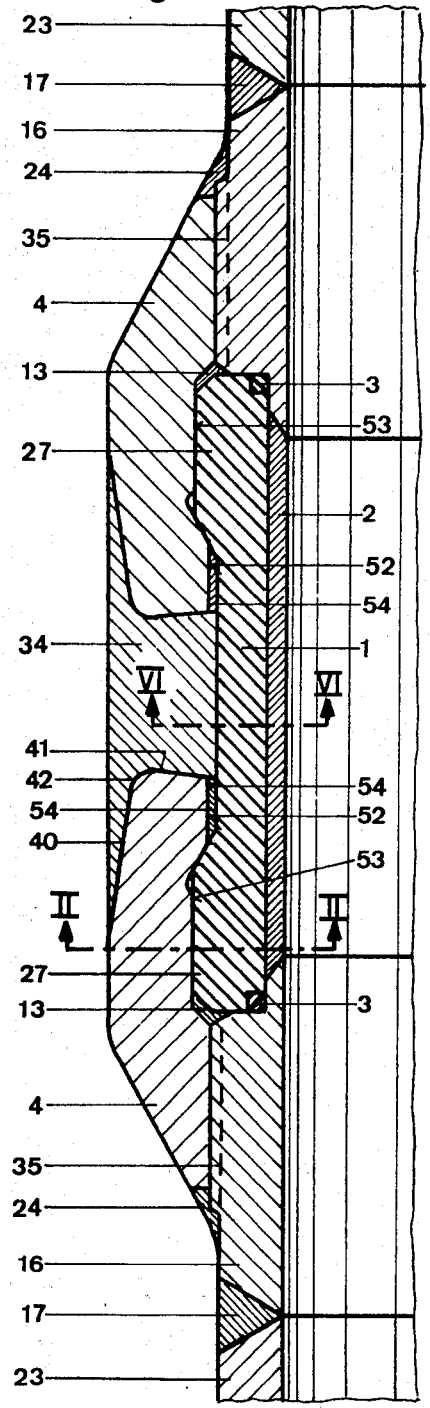

United States Patent [19]
Schwarz

[11] 3,993,331
[45] Nov. 23, 1976

[54] ELECTRICALLY INSULATING PIPE COUPLING

[76] Inventor: Walter Schwarz, Engerthstrasse 237 B, Vienna 2, Austria

[22] Filed: July 10, 1974

[21] Appl. No.: 486,954

[30] Foreign Application Priority Data
July 13, 1973 Austria .............................. 6215/73

[52] U.S. Cl. ................................ 285/53; 285/373; 285/397
[51] Int. Cl.² ......................................... F16L 11/12
[58] Field of Search ................... 285/48, 50, 52, 53, 285/54, 47, 331, 293, 370, 371, 373, 423, 397, 393, 398, 419, DIG. 16, DIG. 20; 138/128, 141, 144, 151, 154, 156, 163, 124, 125; 403/300, 341

[56] References Cited
UNITED STATES PATENTS

| | | | |
|---|---|---|---|
| 498,876 | 6/1893 | Bells | 285/393 X |
| 1,214,985 | 2/1917 | Barber | 285/373 X |
| 1,329,121 | 1/1920 | Hachman | 285/371 X |
| 2,903,279 | 9/1959 | Bergstedt et al. | 285/373 |
| 3,156,489 | 11/1964 | Deringer | 285/DIG. 20 |
| 3,185,501 | 5/1965 | Bowan et al. | 285/52 |
| 3,279,503 | 10/1966 | Carbone et al. | 138/128 |
| 3,687,491 | 8/1972 | Marshall | 285/371 X |
| 3,711,124 | 1/1973 | Gerholt et al. | 285/47 |
| 3,829,340 | 8/1974 | Dembiak et al. | 138/151 X |

FOREIGN PATENTS OR APPLICATIONS

| | | | |
|---|---|---|---|
| 998,412 | 9/1951 | France | 285/DIG. 16 |
| 438,262 | 11/1935 | United Kingdom | 285/53 |

*Primary Examiner*—Werner H. Schroeder
*Attorney, Agent, or Firm*—Kinzer, Plyer, Dorn & McEachran

[57] ABSTRACT

Two sockets of electrically conducting material are provided, each of which has a free end face spaced from the other socket. A tubular coupling member is provided, which consists of plastics material in which reinforcements are embedded. Said coupling member is tightly fitted at each of its ends in one of said sockets and is surrounded by said free end face thereof and provided at each of its ends with an annular bead disposed in the respective socket. Said coupling member is formed with at least one interface which extends throughout the length of the coupling member and is defined by two abutting surfaces. A layer of insulating material surrounds said coupling member between said free end faces.

26 Claims, 18 Drawing Figures

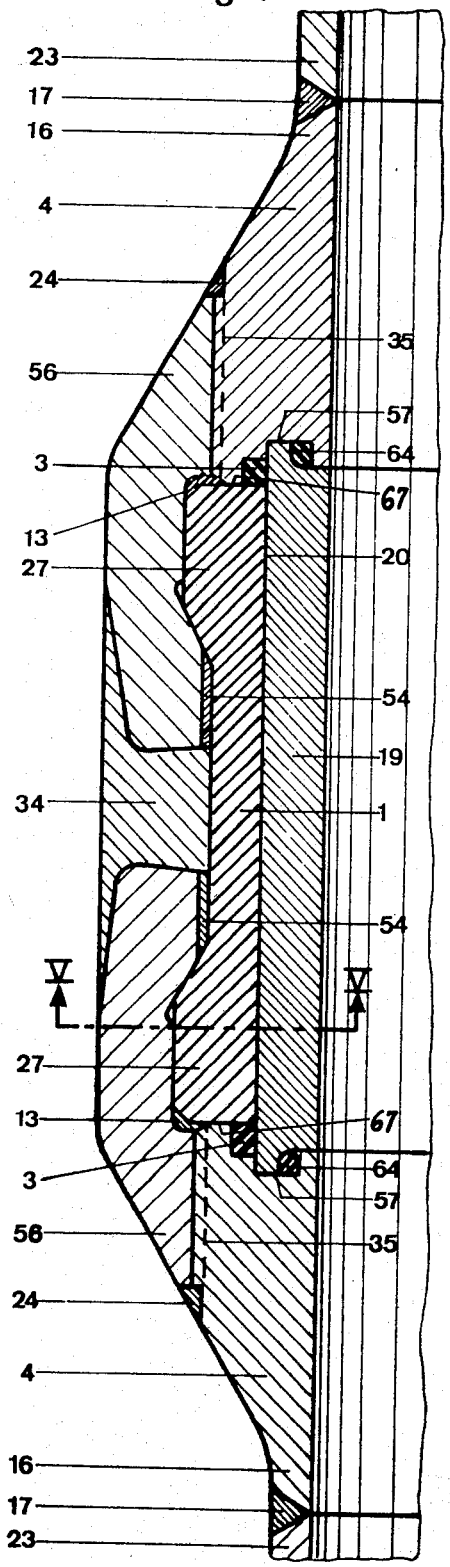
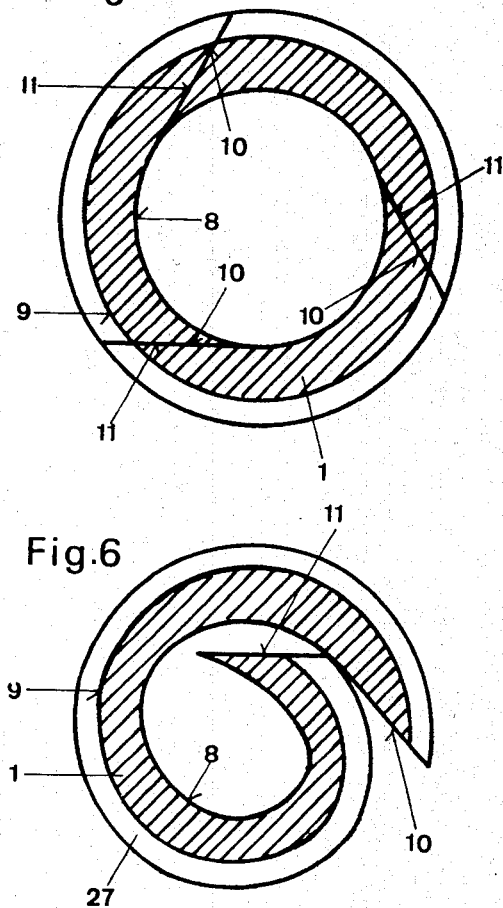
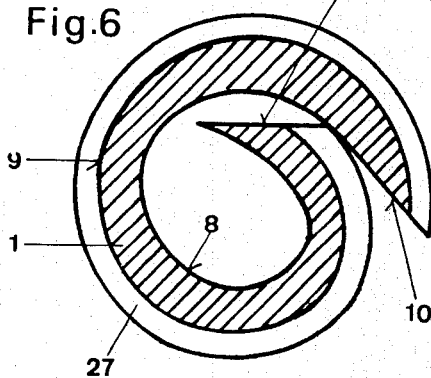
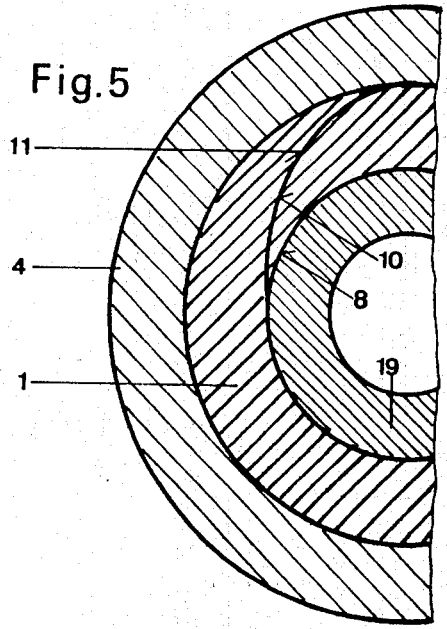

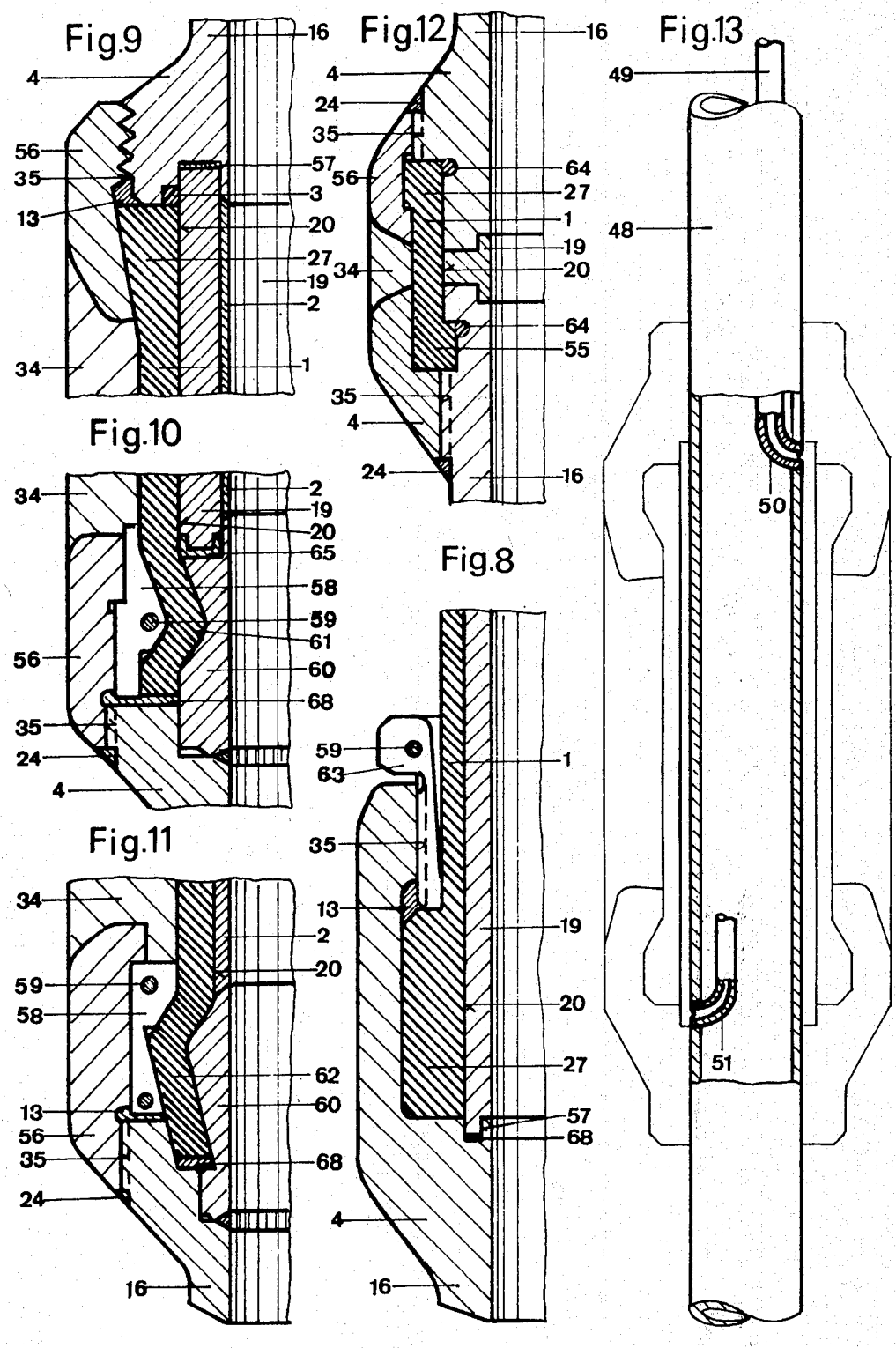

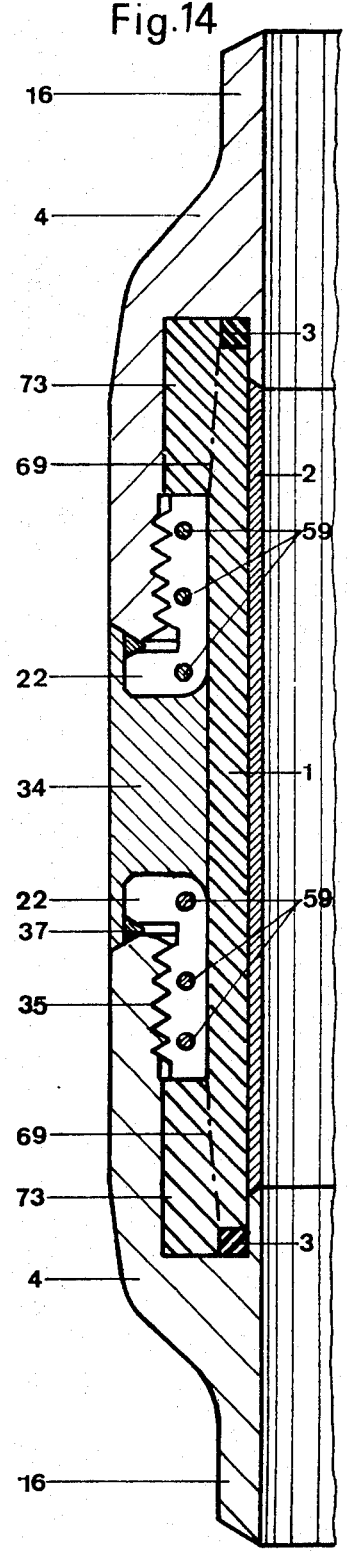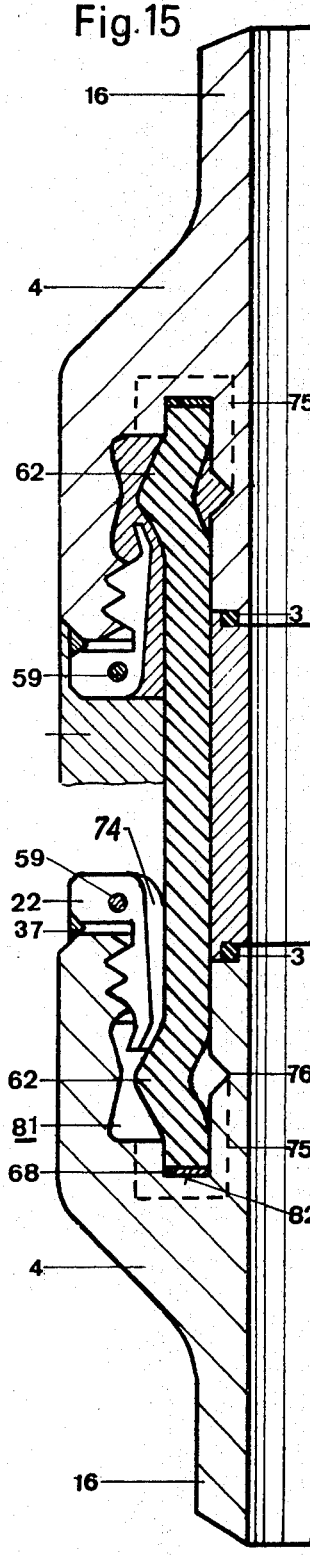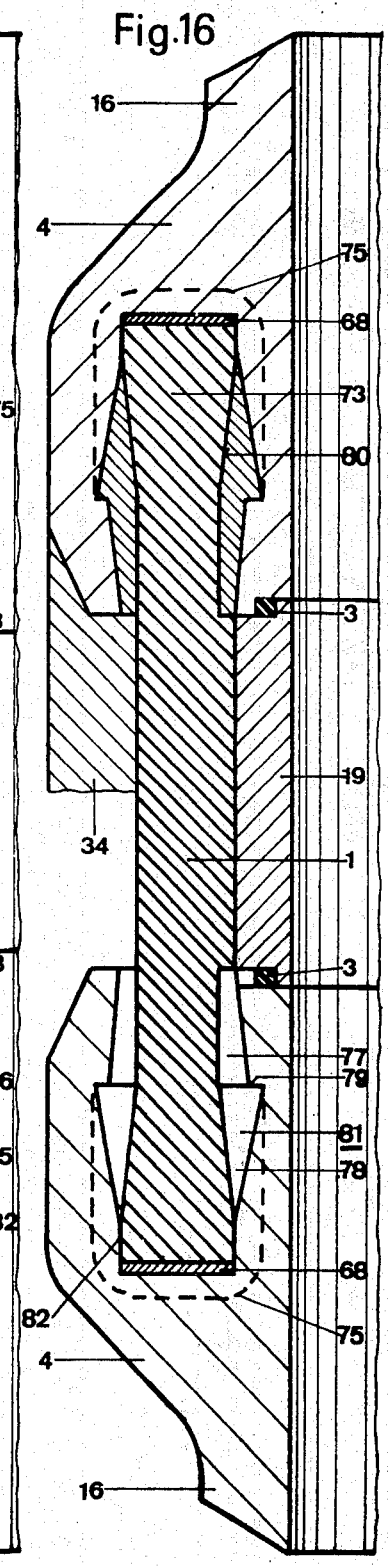

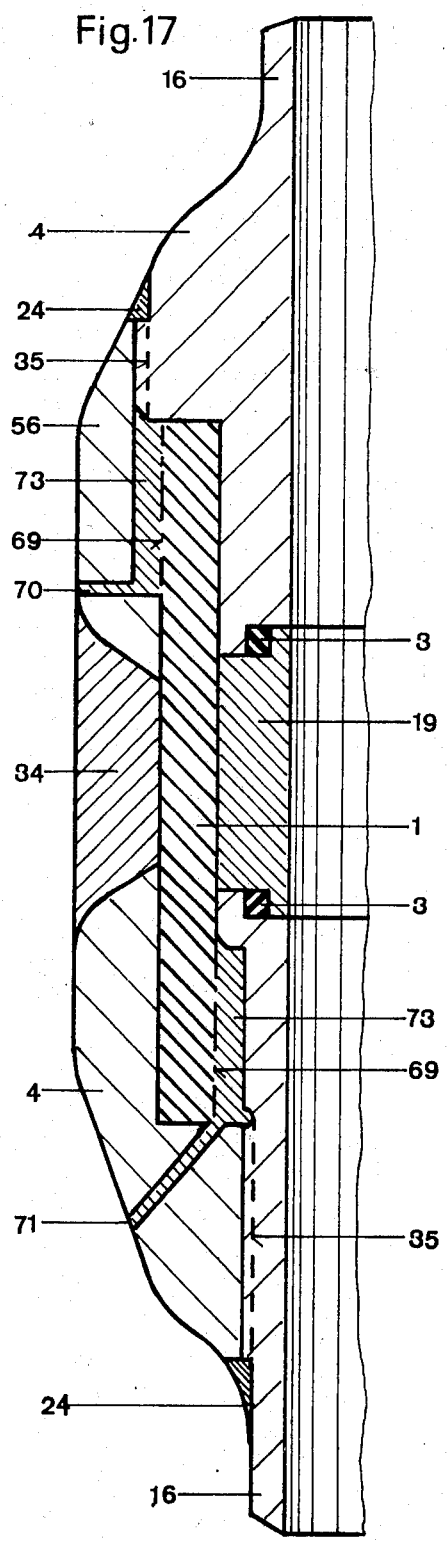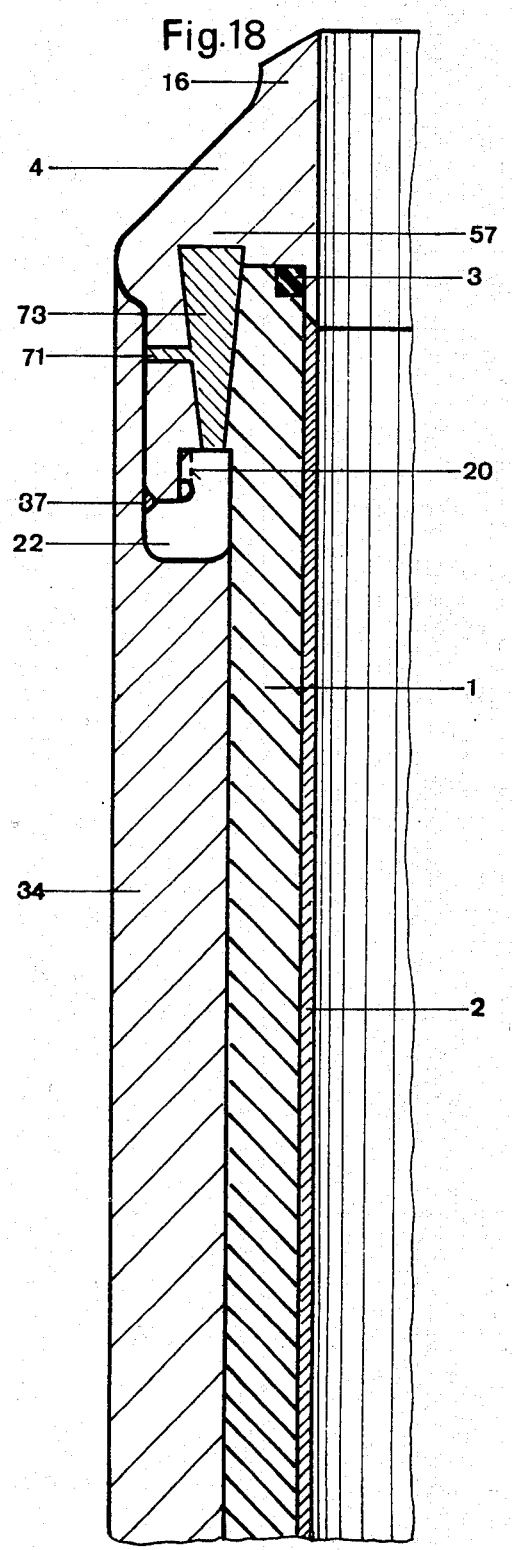

ELECTRICALLY INSULATING PIPE COUPLING

This invention relates to an electrically insulating pipe coupling which comprises a tubular coupling member of reinforced plastics material, which coupling member is provided at opposite ends with annular beads and at said end is tightly inserted in sockets of electrically conducting material, at least one layer of insulating material being disposed in the space between the mutually opposite end faces of the sockets and the coupling member. Such pipe coupling has been covered by the U.S. patent application Ser. No. 352,279, now U.S. Pat. No. 3,862,771.

Pipe couplings of this kind have a high insulating value and an adequate strength so that they may resist even high pressure. On the other hand, they have the disadvantage that they cannot be economically made.

It has been found that a pipe coupling of this kind may be made at much lower cost if it is designed, in accordance with the invention, so that the coupling member has in at least one portion of its wall a pair of abutting surfaces which extend throughout the length of the coupling member and are preferably adhesively bonded.

The abutting surfaces are desirably adhesively bonded throughout the length of the coupling member. Alternatively and in dependence on the pressure to be withstood by the coupling member and the pipeline in which it is to be installed, it may be sufficient to adhesively bond the abutting faces only at discrete points or there may be no need for any adhesive bond between said abutting surfaces.

If the wall of the coupling member is longitudinally divided only at a single point so that there are only two abutting faces, the position and design of these abutting faces will permit a curling of the coupling member about its longitudinal axis to a smaller or larger extent so that the curled coupling member can be inserted into cup- or tulip-shaped sockets and can be permitted to spring outwardly as soon as the annular beads are disposed in the socket. As a result, the annular beads expand within the sockets and engage the inside surface of the sockets until the annular beads are substantially relaxed. An adhesive layer disposed between the abutting faces is thus relieved from tensile or compressive stresses.

In a simple method of forming the abutting surfaces in the coupling member, the latter is first formed in tubular shape by winding or centrifugal casting and is then cured, and the resulting tubular coupling member is cut open along a generatrix with a suitable tool, such as a circular saw, a diamond abrasive cut-off wheel, or an electron beam.

A pipe coupling in which the annular beads of the coupling member exactly fit into the cavities of the sockets distinguishes by a high strength in an axial direction. It has been found that this high strength can also be obtained, without a special expenditure involved in an exact fitting of these parts, if the pipe coupling is designed so that there is a clearance space between the inside surface of the socket and the outside surface of the annular bead and said clearance space is filled with a chemically cured composition.

Whereas said clearance space may be filled with any thermosetting composition, compositions of duromers and fillers, such as short fibers, have proved particularly satisfactory for this purpose.

In another embodiment the end portions of the coupling member are offset and combined with split stressing rings, whose parts are held together by dowel pins to provide equivalents for the above-mentioned annular beads. These end potions of the coupling members interlock with internal pipe sections which are firmly connected to the sockets.

When the pipe coupling according to this embodiment is to be assembled, the coupling member is expanded and permitted to spring back around the internal pipe sections. As a result, the abutting surfaces engage each other and will then be firmly interconnected when the binder provided between them as an adhesive has been cured. The parts of stressing rings are now placed over the offset end portions of the coupling member and interconnected by means of dowel pins. Finally, these parts are surrounded with a screw-threaded socket and are screw-tightened against the above-mentioned pipe section.

Each end portion of the coupling member may be offset inwardly, toward the interior of the pipe, or outwardly, away from the interior of the pipe. In another embodiment the coupling member has an inwardly offset end portion and an outwardly offset end portion.

A pipe coupling of the kind described first hereinbefore may be made in the same quality but with much higher economy even if an annular bead consisting of thermosetting plastics material, which contains a filler, is cast or injection-molded on a bonding surface at each end of the coupling member.

In this embodiment, a pipe may be provided first which has been formed by winding fibers impregnated with plastics material. The individual coupling members are cut from said tube and the annular beads are cast or injection-molded outside or inside the sockets on the coupling members, whose end portions may previously have been taper-turned.

In those embodiments in which the annular beads are cast or injection-molded on the coupling member outside the sockets, the coupling member provided with the annular beads may be cut open throughout its length and the resulting abutting surfaces may be adhesively bonded.

Thermosetting resins which harden when they have been cast or injection-molded are known and commercially available. Their strength may be considerably increased by the addition of certain known fillers in the form of staple fibers or powders. An example of a suitable filler-containing composition is an epoxy resin which contains 3% by weight of short-staple carbon fibers, although the invention is not restricted thereto.

Figure 2:
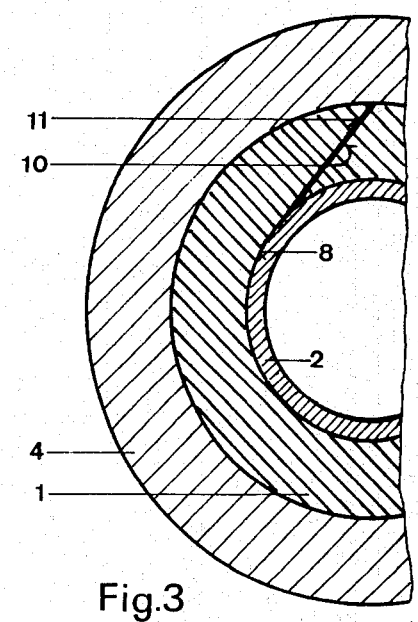
Figure 3:
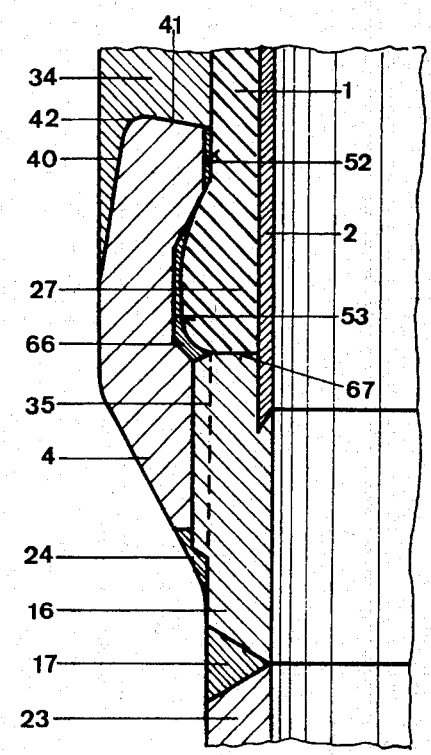

The invention will be described more fully with reference to illustrative embodiments shown on the accompanying drawings, in which FIG. 1 is a fragmentary sectional view showing the wall of a pipe coupling according to the invention, FIG. 2 is a fragmentary sectional view taken on line II—II in FIG. 1, FIG. 3 is a fragmentary sectional view showing a pipe coupling in which the annular bead of the coupling member has a rounded surface, and FIG. 4 is a fragmentary sectional view showing an embodiment of the pipe coupling according to the invention comprising in addition to the coupling member a tight reinforcing pipe which consists of plastics material and comprises embedded reinforcements and on its outside peripheral surface is provided with an elastomeric coating.

FIG. 5 is a fragmentary transverse sectional view taken on line V—V in FIG. 4,

FIG. 6 is a slightly enlarged sectional view taken on line VI—VI of FIG. 1 and showing the coupling member in a curled state, FIG. 7 is a sectional view taken on line VI—VI of FIG. 1 and showing another embodiment of a coupling member, which has three pairs of abutting surfaces, FIG. 8 is a fragmentary sectional view showing a pipe joint of a pipe coupling having a coupling member provided with a divided stressing ring which is screwed into the socket, FIG. 9 is a view similar to FIG. 8 and shows an embodiment comprising a conical annular bead, which flares toward the end of the coupling member, FIGS. 10 and 11 are views similar to FIG. 8 and show embodiments in which the end portion of the coupling member is offset, FIG. 12 is a fragmentary longitudinal sectional view showing a pipe coupling in which the coupling member has an inwardly protruding annular bead and an outwardly protruding annular bead, FIG. 13 is a sectional view showing means for providing a pipe coupling according to the invention with a protective liner, FIGS. 14 to 18 show embodiments of a pipe coupling of the type defined first hereinbefore, in which the annular beads have been cast or injection-molded on the coupling member inside or outside the sockets, FIG. 14 is a fragmentary longitudinal sectional view showing an embodiment in which the coupling member consists of a prefabricated part, FIG. 15 is a fragmentary longitudinal section showing a coupling which has outwardly offset end portions. The filled clearance spaces in the socket are shown in the upper portion of this figure and the clearance spaces yet to be filled in the lower portion thereof, FIG. 16 is a view similar to FIG. 15 and shows an embodiment having no split stressing ring, FIg. 17 is a fragmentary longitudinal sectional view showing a pipe coupling in which the coupling member comprises an inwardly protruding annular bead and an outwardly protruding annular bead, which has been cast in the socket, and FIG. 18 is a sectional view showing a pipe joint in a pipe coupling comprising an annular bead which has been cast in the socket and has a wedge-shaped ring cross-section.

As is shown in FIG. 1, a coupling member 1 has annular beads 27, which are anchored in the cup- or tulip-shaped socket 4. Thus each socket 4 as illustrated, is cup-shaped and has an opening defined by the free end face of the socket, which opening is constricted with respect to the inner periphery 53 of the socket. On its inside surface, the coupling member 1 is provided with a protective liner 2. Throughout its outside surface between the end faces of the sockets 4, the coupling member 1 is provided with a layer 34 of a fiber-reinforced synthetic resin. The layer 34 may consist of wound fiber or fabric material impregnated with synthetic resin and/or of injection-molded compositions of fiber-filled synthetic resin.

The free end portion or face of each socket 4 preferably comprises a tapering conical surface 40 and a conical surface 41. These two surfaces intersect at the axially outermost edge 42 of the socket 4.

The sockets 4 are secured to pipe sections 16 by means of screw threads 35 and seam welds 24. An annular clearance space 54 between the inside surface 52 of the socket 4 and the coupling member 1 and a clearance space 13 adjacent to the screw threads 35 and the end of the annular bead 27 are filled with a thermosetting synthetic resin. That composition may consist of duromers or tough-elastic resins, such as epoxy resins, provided with short fibers or of polyester-urethane blends or cold-vulcanized silicone rubber, to which a filler has been added.

The pipe sections 16 are connected by seam welds 17 to the pipes 23 of the pipeline which is electrically insulated by means of the pipe coupling according to the invention. The pipe sections 16 preferably have the same cross-section as the pipes 23. Gaskets 3 may be inserted between the pipe sections 16 and the coupling member 1.

It is apparent from FIG. 2 that the coupling member 1 has two adhesively bonded abutting surfaces 10, 11.

FIG. 6 is a sectional view taken on line VI—VI of FIG. 1 and showing the coupling member 1 which has been curled about its longitudinal axis to facilitate its insertion into the cup-shaped sockets 4.

To assemble the pipe coupling, the coupling member 1 is spirally curved and then inserted into the socket 4 and subsequently permitted to expand so that the annular beads 27 become anchored in the sockets 4.

The firm retention of the coupling member 1 in the sockets 4 is highly desirable for the subsequent application of the layer 34 of reinforcing strands or woven fabrics previously or subsequently impregnated with synthetic resin. This firm retention is accomplished in that the annular beads 27 completely or at least partly interlock with the inside surfaces of the sockets 4. The coupling member 1 has cylindrical surfaces adjoining the annular beads 27 and these cylindrical surfaces may engage cylindrical surfces 52 of the sockets 4, although this is not shown.

FIG. 3 shows a modification of the embodiment of FIG. 1. A clearance space 66 filled with a cured composition is provided between the inside peripheral surface 53 of the socket 4 and the annular bead 27 of the coupling member 1. FIG. 3 shows also that the annular bead 27 may have a rounded surface.

The embodiment shown in FIG. 4 comprises in addition to the coupling member 1 a tight, unsplit additional tube 19, which is usually made by winding from fibers coated with synthetic resin. This tube 19 serves to reinforce the pipe coupling and extends beyond the gap 67 between the inside surface of the socket and the end face of the coupling member 1. At said gap 67, the coupling member 1 may directly contact the socket 4 (FIG. 3), or gaskets 3 (FIG. 4) may be provided.

The ends of the wound unsplit tube 19 of plastics material may be located in grooves 57 of the socket 4 with sealing rings 64 interposed.

FIG. 9 shows a conical annular bead 27, which is gripped between an undivided tube 19 provided with a low-friction layer 20, a crewed-on screwed-on ring 56 and the socket 4. The tube 19 and the low-friction layer 20 consist of plastics material.

The wound tube 19 of plastics material is provided on its outside peripheral surface with an elastomeric layer 20.

FIG. 5 shows abutting surfaces 10, 11, which extend parallel to each other and are adhesively bonded to form a continuously curved, trough-shaped joint. The abutting surface 10 is the outer surface with respect to the tube axis and extends tangentially to the inside surface 8 of the tubular coupling member 1.

FIG. 7 shows a coupling member 1 which is divided into three parts by pairs of abutting surfaces 10, 11. The parts are identical and can suitably be made with high economy from reinforced plastics material by a continuous drawing and pressing process.

In the embodiment shown in FIG. 8 the coupling member 1 is reinforced by an underlying, tight, unsplit plastics material tube 19, which is provided with a layer 20, and the members 1 and 19 are jointly inserted into a socket 4, which is integral with a pipe section 16. An axial backlash of the annular bead 27 in the socket is prevented by means of a divided stressing ring 63, which is held together by a dowel pin 59 and can be screwed into screw threads 35 of the socket 4.

An annular clearance 68 in the bottom portion of the groove 57 is usually filled with a sealing compound.

FIG. 10 describes a pipe joint in which an annular bead is replaced by an equivalent arrangement comprising an inwardly offset end portion 61 of the coupling member 1 and a divided stressing ring 58 provided with a dowel pin 59. The annular bead consisting of these two parts is gripped between a tubular section 60, the socket 4, and a socket ring 56 screwed onto the socket 4. The pipe section 60 has a profile to mate with the annular bead and may be welded, if desired, to the pipe socket 16 and/or the socket 4. The socket ring 56 screwed onto the socket 4 is joined to the latter by a seam weld 24. Instead of a continuous seam 24, some interrupted seam welds may be provided to hold the socket ring on the socket 4.

FIG. 11 shows an analogous embodiment comprising a coupling member 1 which has an outwardly offset end portion 62.

The coupling shown in FIG. 12 comprises a coupling member 1, which is provided at one end on its outside surface with an annular bead 27, which by a screwed-on socket ring 56 is forced against the socket 4. At its other end, the coupling member 1 is provided on its inside surface with an annular bead 55, which is forced against the pipe section 16, having a mating profile, by a socket 4, which with screw threads 35 is screwed on the pipe section 16. Gaskets 64 may be provided where the coupling member 1 engages the pipe section 16 and the socket 4. An unsplit tight tube 19 of plastics material is inserted between the pipe sections 16 and is circumferentially surrounded by the coupling member 1 and is coated with a layer 20 which is preferably elastomeric.

The layer 20 constitutes a protective liner and may be applied in any desired manner.

To ensure that this protective liner will perform its sealing function, the liner is preferably applied in the manner illustrated in FIG. 13. In this case the pipe coupling is fitted on a tube 48, which serves as a hollow core for the casting of the liner compound and is provided with a feed conduit 49 and a venting conduit 51.

The space for the protective liner is completely filled with the liner composition in a vacuum by means of this arragement and the liner composition is then cured. The core tube 48 is subsequently pulled out of the pipe coupling. The tube 48 may consist of an expanding tube and is coated on its outside surface with a parting agent.

FIGS. 14 to 18 describe some embodiments of the pipe coupling of the kind described first hereinbefore. These embodiments can be made in a particularly economical manner in that the annular beads 73 are cast or injection-molded on the coupling tube 1.

In the embodiment shown in FIG. 14 the coupling member 1 was made first. For this purpose a tubular rod made of fiber-reinforced plastics material was provided and a piece having the length of the coupling member was cut from said rod.

The cut-off tubular member was then taper-turned at each end in the area in which the annular bead was to be cast on. The inclination of the conical surface amounted to about 3°The thus prepared end portions of the coupling member tube 1 were surrounded with a mold, in which the annular beads 73 were cast on the coupling member tube 1. When the annular beads had been hardened, the coupling member was removed from the mold and placed on stock.

In this embodiment the prefabricated coupling member 1 is inserted into the sockets with the aid of gaskets 3 and is tightened in the sockets 4 with respective divided stressing rings 22. Each stressing ring 22 is held together by dowels 59 and is screwed into the socket 4 by means of screw threads 35 and is secured to the socket 4 by means of interrupted seam welds 37.

In the embodiment shown in FIG. 15 the coupling member 1 has outwardly offset end portions 62, which are disposed in a mold cavity 81, which includes a trough 76, a duct 75, and a feed passage 74. The latter is formed in a divided stressing ring 22. The mold cavity 81 is filled entirely with a cast mixture consisting of a resin and a filler.

If the annular bead 73 is provided on and below or both radially outwardlly of and radially inwardly of an outwardly offset end of the coupling member, as has been shown, the coupling member will be particularly strongly interlocked with the socket 4 so that the resulting pipe coupling will have a high tensile and torsional strength.

In the pipe coupling shown in FIG. 16, the coupling member 1 has a constant wall thickness in its central portion and at each of its ends and an increasing wall thickness between the central portion and each end porton. The socket 4 is formed with a cavity 81, through which the coupling member 1 extends and which is filled with a cast mixture of resin and filler or with a metal. The end portion of the coupling member has a constant wall thickness and with a resilient gasket 68 interposed fits a groove 82. A portion 77 of the cavity 81 extends from the feed opening on the outside and inside surfaces of the coupling member 1, which in that portion has a constant wall thickness, as far as to a shoulder 79. The portion 77 widens continuously as far as to the shoulder 79 and at said shoulder suddenly widens to its largest width. A portion 78 of the cavity 81 adjoins the portion 77 and has a decreasing width, whereas the wall thickness of the coupling member 1 increases along the portion 78. To fill that portion of the cavity 81 which is disposed inside the coupling member 1, said portion is connected by a duct 75 to that portion of the cavity 81 whih is disposed on the outside of the coupling member 1.

In the embodiment shown in FIG. 17, annular beads 73 are respectively provided on the outside and inside of the coupling member 1 and the cavities in which said annular beads are cast are entirely filled with a composition fed through feed ducts 70, 71.

In the embodiment shown in FIG. 18, an annular space is closed by the divided stressing ring 22 and protrudes over the coupling member 1 into the socket so that a groove 57 having a stepped bottom is formed. That annular space is filled with the material for the annular bead through a feed duct 71.

It will be understood that the invention is not restricted to the embodiments shown by way of example but is capable of numerous modifications and that the plastics materials as well as the means for reinforcing said plastics materials may consist of all materials of these kinds which are suitable for the specific purposes.

The pipe joints of the pipe coupling according to the invention may be equivalently used to join pipes of plastics materials.

What is claimed is:

1. An electricaly insulating pipe coupling, which comprises:
    two sockets of electrically conducting material spaced from one another in axial alignment,
    a tubular coupling member consisting of plastic material in which reinforcements are embedded, said coupling member being tightly fitted at each of its ends by insertion into one of said sockets and provided at each of its ends with an annular bead disposed in the respective socket,
    said coupling member being split longitudinally and thereby formed with at least one interface which extends throughout the length of the coupling member and is defined by two abutting surfaces which allows the coupling to be curled on itself thereby allowing each bead to be disposed as aforesaid, and
    a layer of insulating material surrounding said coupling member between said sockets.

2. A pipe coupling as claimed in claim 1, in which said interfaces forming an interface are adhesively bonded.

3. A pipe coupling as set forth in claim 1, in which said two abutting surfaces forming an interface extend in two parallel planes, one of which is disposed radially outwardly of the other and extends tangentially to the inside peripheral surface of the tubular coupling member.

4. A pipe coupling as set forth in claim 1, in which said interface has the shape of a trough which is continuously curved in cross-section.

5. A pipe coupling as set forth in claim 1, in which said interface is planar.

6. A pipe coupling as set forth in claim 1, in which said interface is helical.

7. A pipe coupling as set forth in claim 1, in which said insulating material consists of plastics material, in which reinforcements are embedded.

8. A pipe coupling as set forth in claim 7, in which said layer consists of wound reinforcing fibers which are impregnated with the plastics material.

9. A pipe coupling as set forth in claim 1, in which said sockets are cup-shaped, defining an inner periphery, each of them having an opening defined by said free end face, which opening is constricted with respect to the inner periphery of its respective socket.

10. A pipe coupling as set forth in claim 8, in which the free end face of each of said sockets comprises an axially outwardly tapering, radially outer end face portion and an axially inwardly tapering, radially inner end face portion intersecting said radially outer end face portion at right angles thereto at a circular line of intersection at the axially outermost portion of said socket.

11. A pipe coupling as set forth in claim 9, in which:
    each of said sockets defines an annular clearance space surrounding said coupling member,
    said annular clearance space is filled with a cured plastic material, and
    said layer of insulating material consists of wound, figer-reinforced synthetic resin.

12. A pipe coupling as set forth in claim 11, in which said annular clearance space is filled with cold-vulcanized silicone rubber.

13. A pipe coupling as set forth in claim 9, in which said coupling member has at least two interfaces, each of which is defined by two abutting surfaces.

14. A pipe coupling as set forth in claim 9, in which a gap is provided between the inner periphery of each socket and said annular bead disposed in said socket, and
    said gap is filled with a composition.

15. A pipe coupling as set forth in claim 14, in which said gap is filled with cold-vulcanized slicone rubber.

16. A pipe coupling as set forth in claim 1, in which:
    one of said annular beads extends inwardly from the inside peripheral surface of said coupling member,
    the other of said annular beads extends outwardly from the outside peripheral surface of said coupling member,
    two pipe sections are provided,
    one of said sockets has an axially inner portion which is intergral with one of said pipe sections and an axially outer, annular portion in screw-threaded engagement with and firmly secured to said axially inner portion,
    the other of said sockets is in screw-threaded engagement with and firmly secured to said other of said pipe sections.

17. A pipe coupling as set forth in claim 1, in which
    at least one of said annular beads is frustoconical and flares axially outwardly,
    each of said sockets is formed with an internal groove,
    a tube of plastics material is provided, which is disposed inside said coupling member and extends at both ends into said grooves, and
    said frustoconical bead surrounds and is supported by said tube.

18. A pipe coupling as set forth in claim 1, in which
    the pipe coupling further comprises a pair of pipe sections,
    each of said sockets is spaced around and secured to a pipe section,
    each of said coupling members has an offset end portion interlocking with the adjacent one of said pipe sections in the adjacent socket, and
    each of said end portions is surrounded by a stressing ring, which is disposed in the adjacent socket and comprises a plurality of ring sectors held together by pins.

19. A pipe coupling as set forth in claim 18, in which one of said offset end portins is radially inwardly offset.

20. A pipe coupling as set forth in claim 18, in which one of said offset end portions is radially outwardly offset.

21. A pipe coupling which comprises a coupling member comprising a tube formed at each end with a bonding surface, and two annular beads surrounding said bonding surfaces and which are molded on respective ones of said bonding surfaces and consist of a thermosetting material which contains a filler.

22. A pipe coupling as set forth in claim 21, in which one of said bonding surfaces is an axially outwardly tapering, frustoconical surface.

23. A pipe coupling as set forth in claim 21, in which one of said bonding surfaces is at least in part an axially outwardly flaring frustoconical surface.

24. A pipe coupling as set forth in claim 21, in which
said coupling member has a radially outwardly offset end portion and
one of said annular beads is disposed on and in said radially outwardly offset end portion.

25. A pipe coupling as set forth in claim 24, in which
each of said sockets is formed with a shoulder adjoining said mold cavity,
said coupling member has a constant wall thickness from adjacent to said feed opening to adjacent to said shoulder, and an increasing wall thickness from adjacent to said shoulder towards the end of the coupling member, and
said mold cavity widens continuously from said feed opening toward said shoulder and tapers continuously from said shoulder toward the end of said coupling member.

26. A pipe coupling as claimed in claim 25, in which
each of said sockets is formed with an internal groove and
each of said end portions of said coupling member has a portion of constant wall thickness which extends in said groove.

* * * * *